(12) United States Patent
Kibbe

(10) Patent No.: US 8,560,378 B1
(45) Date of Patent: Oct. 15, 2013

(54) SYSTEM AND METHOD OF REVIEWING AND PRODUCING DOCUMENTS

(75) Inventor: Laura M. Kibbe, Middlebury, CT (US)

(73) Assignee: Epiq eDiscovery Solutions, Inc., New York, NY (US)

( * ) Notice: Subject to any disclaimer, the term of this patent is extended or adjusted under 35 U.S.C. 154(b) by 0 days.

(21) Appl. No.: 13/602,920

(22) Filed: Sep. 4, 2012

Related U.S. Application Data

(63) Continuation of application No. 13/528,049, filed on Jun. 20, 2012.

(51) Int. Cl.
*G06F 9/46* (2006.01)
(52) U.S. Cl.
USPC ............................................. 705/7.39
(58) Field of Classification Search
USPC .............................. 705/7.27, 7.39
See application file for complete search history.

(56) References Cited

U.S. PATENT DOCUMENTS

| | | | |
|---|---|---|---|
| 7,257,767 B1 * | 8/2007 | Carden, Jr. ................... | 715/234 |
| 7,698,298 B2 * | 4/2010 | Ciaramitaro et al. .. | 707/999.107 |
| 8,024,211 B1 * | 9/2011 | Cohen ......................... | 705/7.14 |
| 8,165,974 B2 * | 4/2012 | Privault et al. ................. | 706/12 |
| 8,190,559 B2 * | 5/2012 | Harada ......................... | 707/608 |
| 2011/0010214 A1 * | 1/2011 | Carruth ............................ | 705/8 |

\* cited by examiner

*Primary Examiner* — Romain Jeanty
(74) *Attorney, Agent, or Firm* — Riverside Law LLP

(57) ABSTRACT

A system and method of providing comprehensive document review, production and reporting is described. The system and method provide a total quality management approach to a document review matter that not only controls costs but increases defensibility of the overall process, thereby reducing risk. The system utilizes unique review and performance metrics, increases quality control, and enhances physical and data security mechanisms. The system of the present invention can be implemented with any document review software or hosted platform desired for use by a customer.

15 Claims, 13 Drawing Sheets

SENT VIA E_MAIL

Review continued all day Monday. Documents for custodian Steve Handel have been completed, and the Gary Korantz set will be completed tomorrow at the latest. The next documents through our workflow will be "Accounting Shared Drive" collection.

Including those documents coded using domain analysis, we have reviewed a total of 147,750 docs through Monday at 8 p.m. Yesterday 12,549 new documents were loaded to the database; there are now 319,705 docs currently on the site. The DiscoveryMetrics report is attached.

Issues/Open Items:

1. Additional document loads should be available early next week for custodians Anthony Miller and Glenda Goodley; we will report document counts as soon as they are available.

2. Next production is set for November 3rd. We will cut off review this Friday at close of business, and create a production starting set. Validation of the potential production universe will follow, where will we run queries to check for any inconsistent coding, run secondary privilege searches, etc. Once this is complete, the potential production set will be set aside for approval of counsel. Production set will be ready for counsel's approval no later than October 26th.

Review Room Questions:

Whether existence of preservation notice dated June 6, 2008– (see GAR_001_0169779) changes our stated "hold trigger date for work product purposes – trigger initially assumed to be January 15, 2009.

Docs of Interest:

Reviewers reported that, in general, the documents continue to support the basic defense themes set out in training. As reported earlier, the majority of responsive documents suggest that the company had reasonable basis for its belief in the safety of the product at issue. The following docs were of interest:

Doc ID
GAR_001_000245927 – Powerpoint presentation dated November 6, 2007 titled "Product Report" – provides solid overview of company efforts to ensure product safety.
LDE_003_00068323 – email from CEO to Sr. VP Quality Assurance, includes the following language "*Don't get in my way on this one. I need to get this product to market no matter the cost.*"
LDE_001_00070362 – corporate Org Chart; includes breakdown of responsibilities for Safety Group.
EDO_001_00075253 – scanned copy of Jeff Perkins HR File; includes signed offer letter.
GPA_004_00058647 – privileged communication; includes some sensitive information about future marketing strategy – we will look for similar documents on the platform to ensure that all are set aside for counsel review prior to production.

Figure 6

| Document | Author | Addressee | Copyee | Date | Privilege Type | Basis |
|---|---|---|---|---|---|---|
| AXN_002_000000001-1678 | Cohen, Al | Esposito, James | Not Applicable | 31-Jul-07 | AC;WP | Communication between non-attorneys gathering information at the direction of Marshall & Horan LLP* re: customer accounts. |
| AZP_002_000000001-0136 | Esposito, James | Cohen, Al;Moseby, Lilian;Forrester, Mike;Simpson, Meg | Not Applicable | 24-Jul-07 | AC | Memorializing legal communications with Marshall & Horan LLP* re: attorney fees. |
| BXI_001_000000001-39209 | Marshall, Thomas* | Schmidt, Francine | Horan, Paul* | 3-Jul-07 | AC | Communication from attorney to non-attorney containing draft documents prepared by attorney providing legal advice re: offer of employment and restrictive covenant agreement. |
| BXI_001_000000001-39209-1 | Not Applicable | Not Applicable | Not Applicable | 28-Jun-07 | AC | Attorney draft of restrictive covenant agreement |
| BXI_001_000000001-39209-2 | Not Applicable | Not Applicable | Not Applicable | 2-Jul-07 | AC | Attorney draft of offer of employment |
| BXI_001_000000001-39209-3 | Not Applicable | Not Applicable | Not Applicable | 2-Jul-07 | AC | Attorney draft of offer of employment |
| BXI_001_000000001-52614 | Schmidt, Francine | Horan, Paul* | Not Applicable | 20-Jun-07 | AC | Communication from non-attorney to attorney requesting legal advice re: compensation plans |
| BXI_001_000000001-52614-1 | Not Applicable | Not Applicable | Not Applicable | 14-Jun-07 | AC | Draft compensation plan provided to attorney to obtain legal advice. |
| QSA_001_000000001-01180 | Horan, Paul* | Byner, Nancy | Not Applicable | 26-Jul-07 | AC;WP | Communication from attorney to non-attorney containing legal advice re: potential litigation |
| QSA_001_000000001-01189 | Horan, Paul* | Byner, Nancy | Not Applicable | 30-Jul-07 | AC;WP | Communication from attorney to non-attorney for purposes of providing information relative to the furnishing of legal advice re: potential litigation. |
| QSA_001_000000001-01189-1 | Not Applicable | Not Applicable | Not Applicable | 30-Jul-07 | AC;WP | Memorandum containing chronology of events attached to communication from attorney for purposes of providing information relevant to the furnishing of legal advice. |

Attachment relationship indicated by document #. Attachments contain same document # as parents, followed by attachment #: -1, -2, etc.
* Indicates atty. Or individual acting under direction of atty.
WP=Work Product; AC=Attorney-Client

Figure 14

SYSTEM AND METHOD OF REVIEWING AND PRODUCING DOCUMENTS

CROSS-REFERENCE TO RELATED APPLICATION

The present application is a continuation of U.S. patent application Ser. No. 13/528,049, filed Jun. 20, 2012, pending, which is hereby incorporated by reference in its entirety herein.

BACKGROUND OF THE INVENTION

The ongoing advancements witnessed in information technology continue to provide tremendous efficiencies and opportunities to business owners. For example, businesses can communicate electronically in a variety of ways, such as via electronic mail, text message or short message service and instant messaging. Further to this, the opportunities to electronically transmit previously or separately recorded communications, in the form of digital images, has grown exponentially, such as via the use of scanned paper documents, digital voicemail and video files, all of which are presentable in a wide range of electronic formats.

While these advantages have improved may business processes, they have also created their own set of problems. In particular, the total amount of recorded information created and possessed by businesses has drastically increased. Of this, about 93% of all data is now created initially on computers, and while this data is recorded on some form of storage media, most of it is never printed out. In fact, it is estimated that over 4 trillion emails are generated per day in the United States. Such levels and volume of data are historically unprecedented.

Unfortunately, this exponential increase in electronic data also means that the costs to meet the procedural requirements of discovery during litigation have skyrocketed, not to mention that the process has become extraordinarily complex, burdensome and risky to the businesses involved in the legal case.

In effect, the overlap of advancing technology with traditional legal roles has made both in-house and outside counsel vulnerable and uneasy with managing the discovery process, as the consequences of a misstep can be severe. For example, in *Qualcomm Inc.* v. *Broadcom Corp.,* 2007 U.S. Dist. LEXIS 57136 (S.D. Cal. Aug. 6, 2007), the Court found by clear and convincing evidence that Qualcomm counsel participated in an organized program of litigation misconduct and concealment throughout discovery, trial, and post-trial before new counsel took over. In *In re Seroquel Products Liability Litigation,* 2007 WL 2412946 (M.D. Fla. Aug. 21, 2007), the Court sanctioned AZ for not "[I]dentifying relevant records [databases] and working out technical methods for their production" and for "purposeful sluggishness" in delaying production. In *Phoenix Four, Inc.* V. *Strategic Res. Corp.,* 2006 WL 1409413 (S.D.N.Y. May 23, 2006), it was shown that, despite counsel's due diligence, they missed a "hidden partition" on a server that contained relevant information. Although counsel disclosed it immediately and produced expediently, the court found the behavior unreasonable. In *Garcia* v. *Berkshire Life Ins. Co. of America,* 2007 WL 3407376 (D. Colo. Nov. 13, 2007), plaintiff's counsel produced ten email strings and two attachments to the defendant, along with a privilege log listing 135 additional emails and documents. In several meet and confers, the defendant told plaintiff that the DVD contained thousands of emails but produced no further emails. In defending a motion to compel, Plaintiff "essentially [plead] technical incompetence with respect to computers." The Court held that if counsel was technically ignorant, he had a duty to seek competent professional assistance to ascertain the contents of the DVD. Lastly, in *Victor Stanley* v. *Creative Pipe, Inc.,* 250 F.R.D. 251 (D. Md. 2008), U.S. Magistrate Judge Grimm held that defendants "failed to demonstrate that the keyword searches they performed on the text-searchable ESI was reasonable" and that the "privilege/protection was waived by the voluntary production of the documents to [plaintiffs] by defendants."

Therefore, there is a need in the art for a system and method of providing comprehensive document review, production and reporting that not only controls costs but increases defensibility of the overall process to reduce overall risk. The present invention satisfies this need.

SUMMARY OF THE INVENTION

The present invention includes a method of reviewing documents for a customer. The method includes the steps of assembling a review team, designating a physical review room accessible only by the review team, training the review team via review of a training documents set, instructing the review team to review customer provided documents on a document review software or hosted platform while in the physical review room, assembling a quality control review team to review up to 50% of the documents reviewed by the review team, and tracking review team performance via at least one metric. In one embodiment, the review team includes at least one attorney. In another embodiment, the review team includes at least one project director. In another embodiment, the review team includes at least one quality control reviewer. In another embodiment, the physical review room is restricted to only review team members by lock and key. In another embodiment, the physical review room contains thin client review stations for each reviewer to review documents. In another embodiment, the document review software or hosted platform is run on a remote server and accessible at each thin client review station via a computer network. In another embodiment, the quality control review team reviews documents on a daily basis. In another embodiment, the documents to be reviewed by the quality control review team are selected randomly. In another embodiment, the method includes a quality control error number threshold. In another embodiment, when the quality control review team reaches the error number threshold, the review team is instructed to re-review the documents. In another embodiment, the quality control review includes multiple review rounds. In another embodiment, the method includes a pre-production quality control validation. In another embodiment, the method includes generating a report to be provided to the customer, wherein the report includes the at least one metric. In another embodiment, the at least one metric is selected from the group consisting of review status, designation analysis, project review rate, reviewer productivity, review quality, designation benchmarking, reporting and quality control.

The present invention also includes a computer implemented system for reviewing electronic documents provided by a customer. The system includes a document review software or hosted platform resident on a remote server, reviewer performance tracking software resident on the remote server, a plurality of thin client review stations, and at least one networked device that permits the document review software or hosted platform and the reviewer performance tracking software resident on the remote server to be accessible by the plurality of thin client review stations, wherein electronic documents provided by the customer are reviewed by a review team via the thin client review stations. In one embodiment, the system further includes prioritizing the electronic documents prior to review by the review team. In another embodiment, a report is generated that includes at least one metric pertaining to the performance of the review team. In another embodiment, the customer is communicatively connected to the system via a communications network.

The present invention also relates to a system for reviewing electronic documents provided by a customer, where the system includes a document review software or hosted platform resident on a remote server, reviewer performance tracking software resident on the remote server, a plurality of thin client review stations, and at least one networked device that permits the document review software or hosted platform and the reviewer performance tracking software resident on the remote server to be accessible by the plurality of thin client review stations, a review team including at least one attorney, a physical review room accessible only by the review team, wherein the review team is trained via review of a training documents set, wherein electronic documents provided by the customer are reviewed by the review team via the thin client review stations while in the physical review room, wherein a quality control review team reviews up to 50% of the documents reviewed by the review team, wherein the performance of the review team is measured according to at least one metric via the reviewer performance tracking software, and wherein a report is generated that includes information pertaining to the at least one review team performance metric.

BRIEF DESCRIPTION OF THE DRAWINGS

For the purpose of illustrating the invention, there are depicted in the drawings certain embodiments of the invention. However, the invention is not limited to the precise arrangements and instrumentalities of the embodiments depicted in the drawings.

FIG. 6 is an exemplary report generated by the system of the present invention.

FIG. 14 is an exemplary privilege log generated by the system of the present invention.

DETAILED DESCRIPTION

Figure 1:
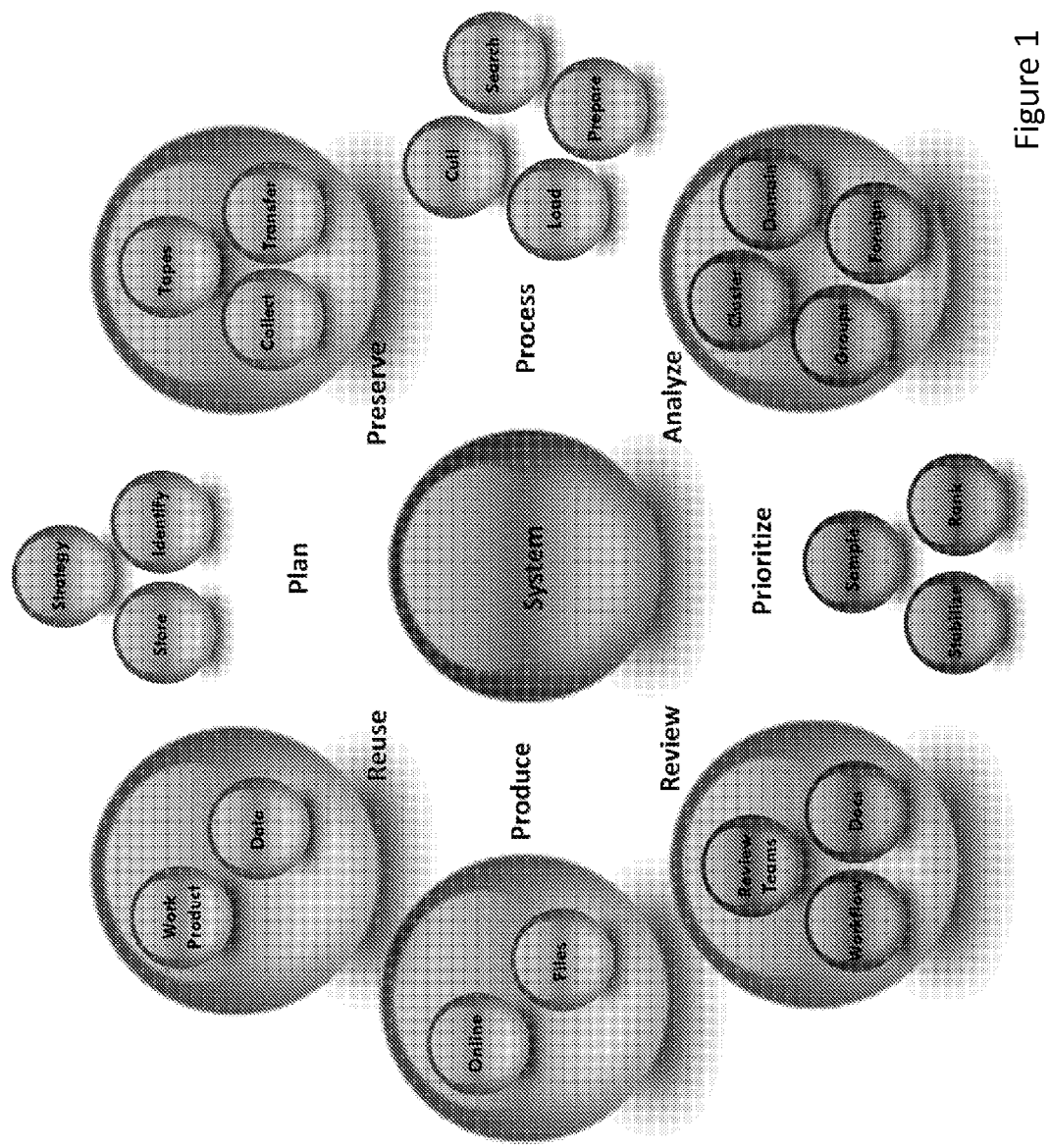
FIG. 1 is a diagram summarizing selected aspects of the system of the present invention.

It is to be understood that the figures and descriptions of the present invention have been simplified to illustrate elements that are relevant for a clear understanding of the present invention, while eliminating, for the purpose of clarity, many other elements found in document review systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods, materials or components similar or equivalent to those described herein can be used in the practice or testing of the present invention, the preferred methods, materials and components are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

The term "document" as use herein refers to any kind of physical or electronic recordation of information. By non-limiting example, electronic documents can be in any format, such as Microsoft Word (.DOC), Microsoft Excel (.XLS), Adobe Acrobat (.PDF), multimedia (.MPEG, .WAV), executable (.EXE), graphic (.GIF, .JPEG), text (.TXT), and the like.

Throughout this disclosure, various aspects of the invention can be presented in a range format. It should be understood that the description in range format is merely for convenience and brevity and should not be construed as an inflexible limitation on the scope of the invention.

Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

System Architecture

As described herein and illustrated generally in FIG. 1, the present invention includes a system and method of providing and performing comprehensive document review, production and reporting. The present invention provides a total quality management approach to the review that not only controls costs but increases defensibility of the overall process, thereby reducing risk. For example, this is accomplished by prioritizing documents, utilizing unique review and performance metrics, increasing quality control, and enhancing physical and data security mechanisms. The system of the present invention is also unique in that it can be implemented with any document review software or hosted platform desired for use by the customer. Examples of such hosted platforms compatible with the system of the present invention include, without limitation, Documatrix®, Relativity®, iCONECT® and Concordance® FYI.

Managing the costs and risks involved in document review requires both strategic and tactical planning. By assessing the scope and needs of a matter early in the process, the system of the present invention can develop and execute a plan to meet customer defined goals. As described hereinthroughout, the system provides a roadmap to stay on schedule and avoid time-wasting wrong turns in the review process.

For example, the system can readily identify all data locations, file types and relevant languages within a data pool or set. The system can also evaluate and recommend a strategy for data preservation and collection, and implement best practices in processing and reviewing requirements to determine the most cost effective approach. The system may further evaluate the overall environment to identify weaknesses in records retention, legal hold, and preservation policies, in conjunction with the customer.

By providing targeted collection and forensics services, the system of the present invention facilitates the successful and secure acquisition of data, whether documents are located locally or around the world, and always with an eye on future processing requirements. For example, the system can: identify opportunities to minimize the volume of data collected; collect data from standard and non-standard office applications, including email servers, network storage, desktop and laptop computers, portable devices, proprietary databases, and other unstructured data; ensure that data is not compromised to maintain defensibility; and analyze risks involved with international data transfers and determine whether there is a need for access to a datacenter internationally.

The system can fully extract metadata, text, embedded objects and domains, so information critical to the matter is not missed. Unnecessary and/or replicate files such as system files and duplicate documents may be removed to further reduce the size and increase the quality of the data set. Further, the system can generate media analysis reports and file inventories to minimize unnecessary processing. The system can fully process over 160 languages and identify such foreign languages so the best approach to handle those documents can be made. Further still, the system can handle a wide range of data formats, including SharePoint, WIKIs, Lotus Notes, Bloomberg data, Unix Mail, Chat, audio, video, and other emerging file types.

As contemplated herein, the system can triage data early in the discovery process, so that documents vital to the matter can be identified and prioritized, while documents that have little or no value can be deferred or even eliminated. The system accomplishes this in a variety of ways. For example, the system can perform topic clustering, where documents with common or shared terms are clustered, enabling someone with case knowledge to handle these documents together. The system can categorize documents, where conceptually-related documents can be grouped, on demand, to create category folders. The system can perform e-mail threading, where e-mails from the same conversation thread are grouped along with attachments. E-mails can then be reviewed in context and only the "inclusive" e-mail containing all past messages is evaluated. The system can also perform a near-duplicate identification of documents, where documents that are identical or similar in content, like a Word document and its PDF version, are grouped so they can be reviewed together. By grouping related documents, the documents are effectively prioritized such that they can be reviewed together, saving valuable time and cutting costs. The system also improves the document production process in a variety of ways. For example, the system can validate a production set to confirm consistency of coding, it can create a privilege log, it can produce as the native file, TIFF or any other file type or file type combination, it can provide secure access for multi-party cases and online productions.

The system of the present invention may operate on a computer platform, such as a local or remote executable software platform, or as a hosted internet or network program or portal. In certain embodiments, only portions of the system may be computer operated, or in other embodiments, the entire system may be computer operated. As contemplated herein, any computing device as would be understood by those skilled in the art may be used with the system, including desktop or mobile devices, laptops, desktops, tablets, smartphones or other wireless digital/cellular phones, televisions or other thin client devices as would be understood by those skilled in the art.

For example, the computer operable component(s) of the system may reside entirely on a single computing device, or may reside on a central server and run on any number of end-user devices via a communications network. The computing devices may include at least one processor, standard input and output devices, as well as all hardware and software typically found on computing devices for storing data and running programs, and for sending and receiving data over a network, if needed. If a central server is used, it may be one server or, more preferably, a combination of scalable servers, providing functionality as a network mainframe server, a web server, a mail server and central database server, all maintained and managed by an administrator or operator of the system. The computing device(s) may also be connected directly or via a network to remote databases, such as for additional storage backup, and to allow for the communication of files, email, software, and any other data format between two or more computing devices. There are no limitations to the number, type or connectivity of the databases utilized by the system of the present invention. The communications network can be a wide area network and may be any suitable networked system understood by those having ordinary skill in the art, such as, for example, an open, wide area network (e.g., the internet), an electronic network, an optical network, a wireless network, a physically secure network or virtual private network, and any combinations thereof. The communications network may also include any intermediate nodes, such as gateways, routers, bridges, internet service provider networks, public-switched telephone networks, proxy servers, firewalls, and the like, such that the communications network may be suitable for the transmission of information items and other data throughout the system.

Figure 2:
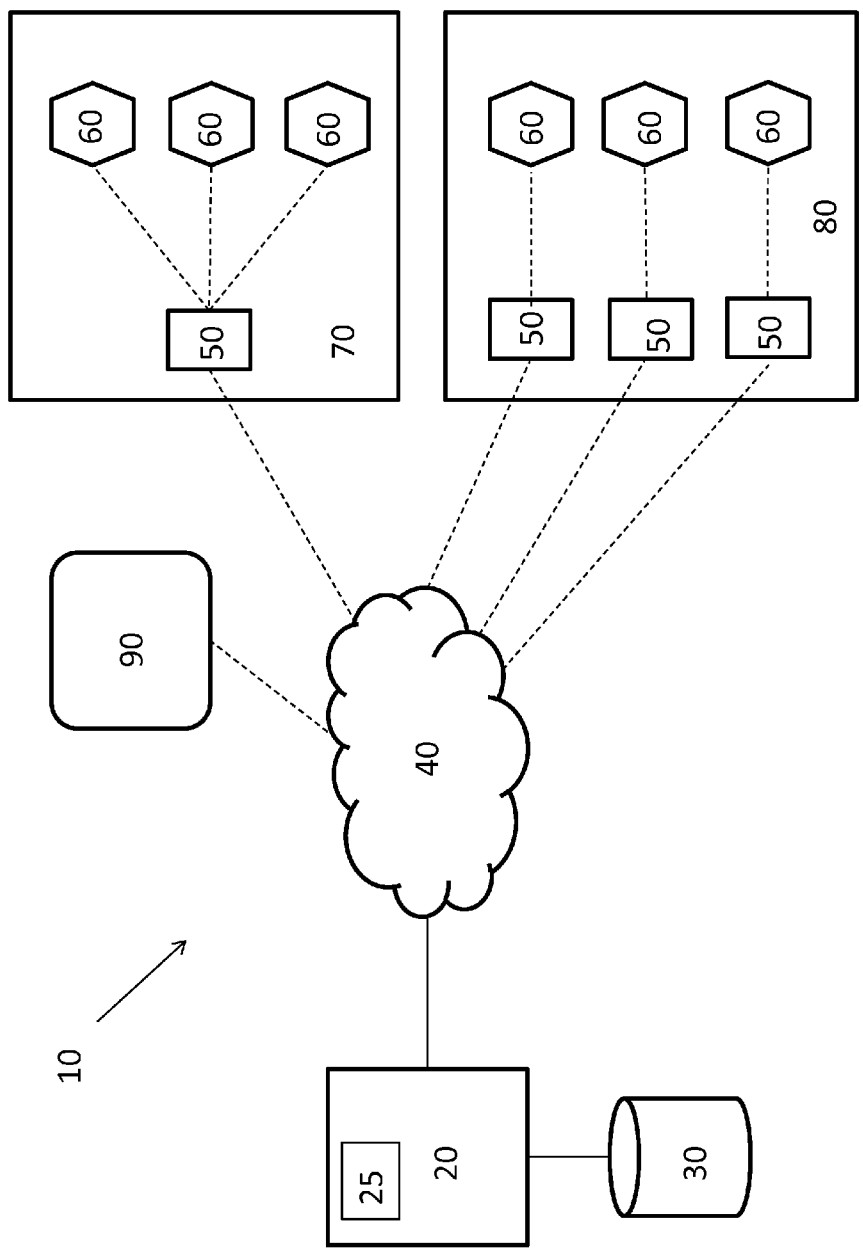
FIG. 2 is a diagram of an exemplary system architecture and communication network, according to an aspect of the present invention.

In a preferred embodiment and as illustrated in FIG. 2, the system of the present invention (system 10) may include a central server 20 having resident therein an OS, GUI and document review platform 25, a database 30 accessible to server 20, a network 40, and at least one review room, such as review room 70, where each review room includes a networked Pano device 50 and a plurality of review stations 60, where each review station includes at least one thin client visual display, keyboard and mouse. Alternatively, as shown in review room 80, each review station 60 may receive data via a separate Pano device 50. In such embodiments, Pano device 50 virtualizes the OS, GUI and document review platform 25 to the visual display of review station 60 from server or server hub 20. Optionally, a customer 90 may also be communicatively connected via network 40, such that customer 90 may exchange information between either server 20 or any of review stations 60.

Further, the communications network may also use standard architecture and protocols as understood by those skilled in the art, such as, for example, a packet switched network for transporting information and packets in accordance with a standard transmission control protocol/Internet protocol ("TCP/IP"). Any of the computing devices may be communicatively connected into the communications network through, for example, a traditional telephone service connection using a conventional modem, an integrated services digital network ("ISDN"), a cable connection including a data over cable system interface specification ("DOCSIS") cable modem, a digital subscriber line ("DSL"), a T1 line, or any other mechanism as understood by those skilled in the art. Additionally, the system may utilize any conventional operating platform or combination of platforms (Windows, Mac OS, Unix, Linux, Android, etc.) and may utilize any conventional networking and communications software as would be understood by those skilled in the art.

To protect data, an encryption standard may be used to protect files from unauthorized interception over the network. Any encryption standard or authentication method as may be understood by those having ordinary skill in the art may be used at any point in the system of the present invention. For example, encryption may be accomplished by encrypting an output file by using a Secure Socket Layer (SSL) with dual key encryption. Additionally, the system may limit data manipulation, or information access. For example, a system administrator may allow for administration at one or more levels, such as at an individual reviewer, a review team manager, a quality control review manager, or a system manager. A system administrator may also implement access or use restrictions for users at any level. Such restrictions may include, for example, the assignment of user names and passwords that allow the use of the present invention, or the selection of one or more data types that the subservient user is allowed to view or manipulate.

As mentioned previously, the system may operate as application software, which may be managed by a local or remote computing device. The software may include a software framework or architecture that optimizes ease of use of at least one existing software platform, and that may also extend the capabilities of at least one existing software platform. The application architecture may approximate the actual way users organize and manage electronic files, and thus may organize use activities in a natural, coherent manner while delivering use activities through a simple, consistent, and intuitive interface within each application and across applications. The architecture may also be reusable, providing plug-in capability to any number of applications, without extensive re-programming, which may enable parties outside of the system to create components that plug into the architecture. Thus, software or portals in the architecture may be extensible and new software or portals may be created for the architecture by any party.

The system may provide software, for example, applications, such as for document review, accessible to one or more users to perform one or more functions. Such applications may be available at the same location as the user, or at a location remote from the user. Each application may provide a graphical user interface (GUI) for ease of interaction by the user with information resident in the system. A GUI may be specific to a user, set of users, or type of user, or may be the same for all users or a selected subset of users. The system software may also provide a master GUI set that allows a user to select or interact with GUIs of one or more other applications, or that allows a user to simultaneously access a variety of information otherwise available through any portion of the system.

The system software may also be a portal or SaaS that provides, via the GUI, remote access to and from the system of the present invention. The software may include, for example, a network browser, as well as other standard applications. The software may also include the ability, either automatically based upon a user request in another application, or by a user request, to search, or otherwise retrieve particular data from one or more remote points, such as on the internet or from a limited or restricted database. The software may vary by user type, or may be available to only a certain user type, depending on the needs of the system. Users may have some portions, or all of the application software resident on a local computing device, or may simply have linking mechanisms, as understood by those skilled in the art, to link a computing device to the software running on a central server via the communications network, for example. As such, any device having, or having access to, the software may be capable of uploading, or downloading, any information item or data collection item, or informational files to be associated with such files.

Presentation of data through the software may be in any sort and number of selectable formats. For example, a multi-layer format may be used, wherein additional information is available by viewing successively lower layers of presented information. Such layers may be made available by the use of drop down menus, tabbed pseudo manila folder files, or other layering techniques understood by those skilled in the art or through a novel natural language interface as described hereinthroughout. Formats may also include AutoFill functionality, wherein data may be filled responsively to the entry of partial data in a particular field by the user. All formats may be in standard readable formats, such as XML. The software may further incorporate standard features typically found in applications, such as, for example, a front or "main" page to present a user with various selectable options for use or organization of information item collection fields.

The system software may also include standard reporting mechanisms, such as generating a printable results report, or an electronic results report that can be transmitted to any communicatively connected computing device, such as a generated email message or file attachment. Likewise, particular results of the aforementioned system can trigger an alert signal, such as the generation of an alert email, text or phone call, to alert a manager, expert, researcher, or other professional of the particular results. Further embodiments of such mechanisms are described elsewhere herein or may standard systems understood by those skilled in the art.

Security Mechanisms

The system of the present invention includes a variety of security features not found in other document review platforms. For example, in one embodiment, each project may have a designated physical review room, such that only team members to the specific project may actually enter the designated review room to review documents for that particular project. The designated review room may be locked, and only accessible by members of that particular project review team and managers. Access can be granted by any key, passcode or other identification system understood by those skilled in the art. For example, each reviewer may be given a key card that allows them access only to the review room for the project they have been assigned. In other embodiments, any type of personal identification scanner may be used to admit the designated reviewer into their assigned review room. The review room may include one or more lockers for each member of the review team to safely place their personal communication devices and other portable electronics or valuables into. In some embodiments, the review team members must remove all communication devices and personal belongings while in the review room, such that they are effectively isolated from all information other than the document review equipment and materials.

In certain embodiments, the document review software or platform may be run on standard computing equipment located within the review room, thereby defining a review station, as would be understood by those skilled in the art. However, it is preferable that the review room stations contain only thin client equipment for each reviewer, such as containing only a visual display, a keyboard and mouse, and a networked device, such as a Pano device, that virtualizes the OS, graphical user interface and document review platform to the visual display from a remotely hosted server or server hub. With such a configuration, there are no local hard drives, no printing or other wireless capabilities within the review room that may interfere with or confound reviewer performance and/or results. For example, the Pano thin client images may be limited to 3 internet sites, such as the review site, the system site and a timekeeping site. This configuration would allow the system to test connectivity without permitting reviewers access to any outside communication channel or extraneous software. In still other embodiments, other remotely hosted platforms may be selectively included, such as instant messaging or video feeds restricted to a designated project manager and/or the customer, or any other remotely hosted program or widget understood by those skilled in the art.

Selection and Management of Review Teams

In one aspect, each project is assigned a review team comprising at least one reviewer and a project director. A quality control reviewer or specialist may also be designated for a project. In the event there are multiple projects, a system manager may oversee each project director. For example, each project is assigned a work team comprising at least one reviewer, where the at least one reviewer is an attorney. In one embodiment, the review team may include at least five attorneys and a quality control team leader. In another embodiment, the review team may include at least 10 attorneys and a quality control team leader. In a preferred embodiment, the review team includes between 10-15 reviewers and one project manager. As contemplated herein, there is no limit to the size and/or professional qualifications of each work team.

The system of the present invention incorporates a stringent team reviewer qualification requirement when selecting and populating a review team. Because document review is more than just the mechanical process of marking and tagging documents, the system of the present invention facilitates true knowledge transfer between the review room and the customer. For this reason, work teams are preferably staffed with only licensed attorneys with at least 5 years of actual practice experience in the particular substantive litigation area at issue. This range of attorney reviewer qualification achieves the best balance of efficiency and knowledge transfer ability such that the legal team is aided in its fact development efforts on a daily basis by the team(s). In furtherance of these requirements, potential reviewers may be screened via extensive background checks, criminal history, credit and licensing checks on each candidate, for example, Such information may also be updated periodically to ensure there has been no change in status. In certain embodiments, the present invention may include a pre-screened pool of temporary attorneys, all of whom meet the criteria referenced above. Contracted resources may be supplemented with direct employees and contractors of the system. To the extent an off-shore component is desired (or required), the system of the present invention may manage both the onshore and offshore team members under one umbrella.

Reviewer Training Mechanisms

In another aspect, the system of the present invention may include the creation and/or use of training documents. Such training documents may be generated by the system of the present invention, by the customer or any combination thereof. In one embodiment, each reviewer is assigned a training binder that includes at least a portion of the training documents on the first day of training. Preferably, the binder does not leave the review room at any time and is provided to the customer at the conclusion of the review for inclusion in the customer's work product file.

As contemplated herein, training may take less than a day, at least one day, at least two days, or even up to a week. The amount of time training reviewers will typically be determined on a project by project basis, and may further be determined by the customer. In one embodiment, the training period may be about two days, where the first day begins with approximately half a day of substantive training by the customer. During the second half of day one, the review team receives technical training on the desired review platform and a walk through of the protocol document and coding forms is performed to be sure that everyone understands not only substantively, but procedurally, how the review will be run.

At the conclusion of the platform training, the training or "dummy" batches are assigned to each reviewer. These may be any combination of fictitious or real documents used for training purposes. The reviewers proceed to review the dummy batches, preferably with the customer present in the review room, such that the reviewers can ask questions, clarify protocol ambiguities that were not anticipated, and the like. Once the customer and the review team agree that they understand their scope of work, the training documents are cleared and the designed review workflow begins. As additional training questions are presented by the review teams, all follow-on questions may be conveyed to the customer on a daily or other periodical basis in writing.

System Workflow

Figure 3:
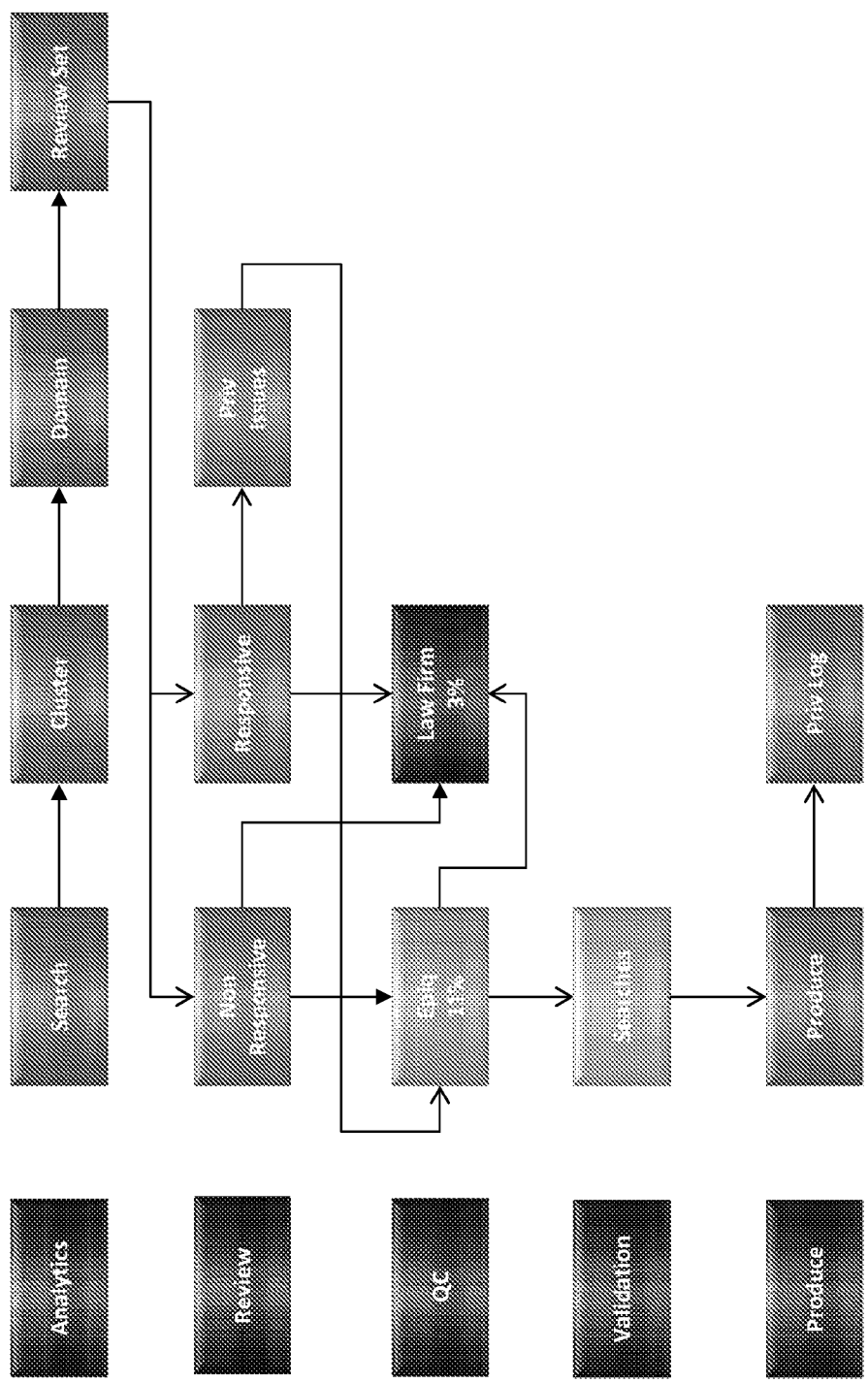
FIG. 3 is an exemplary system workflow chart, according to an aspect of the present invention.

As illustrated in FIG. 3, the present invention may follow a workflow generally including five phases: Analytics, Review, Quality Control, Validation and Production.

With respect to the Analytics phase, this phase can be divided into four subparts: Search, Cluster, Domain and Review Set. The Search subpart involves procedures common to early case assessment analysis including to search for, collect, and identify all documents, data and key terms relevant to the inquiry or issue. The Cluster subpart refers to the application of advanced search methods to create and identify associations and relationships between documents and data to assist in the identification of relevant documents for review. The Domain subpart refers to the continued categorization of documents by domains, particularly with respect to email and to identify documents that may be subject to the attorney-client privilege and/or attorney work product protection. The Review Set subpart refers to the further categorization and identification of a specific set of documents that will be subject to the Review phase.

With respect to the Review phase, this phase can be divided into three subparts: Non-responsive, Responsive and Privilege Issues. The Non-Responsive subpart refers to the identification of documents that are not relevant and/or not responsive to the inquiry or request at issue. The Responsive subpart refers to the identification of documents that are relevant and responsive to the inquiry or request at issue. The Privilege Issues subpart refers to the identification of documents that are subject to the attorney-client privilege and/or attorney work product protection and are therefore not to be produced. After the Review Set is determined, documents may be identified as either Non-Responsive or Responsive. Those that are Responsive are reviewed for potential inclusion in the Privilege Issues category (thereby rendering them non-producible except that they may be referenced in connection with a "privilege log").

With respect to the Quality Control phase, a subset of documents (FIG. 3 shows 11% as the representative sample) that are identified as Non-Responsive, Responsive/Not-Privileged or Responsive/Privileged are subject to a second review for accurate categorization, and which may then be further similarly reviewed by the customer (FIG. 3 shows 3% as the representative sample). To the extent that there are documents that have been identified as Non-Responsive or Responsive, a subset of those documents (FIG. 3 shows 3% as the representative sample) may also be reviewed by the customer to ensure accurate categorization.

With respect to the Validation phase, this represents a pre-production, quality control validation process involving a three-step approach that may be used to identify miscoded documents. Such process involves the creation of queries by: (1) finding documents miscoded for technical reasons, such as a missing decision on a document; or (2) finding documents more likely to be coded incorrectly by searching for common mistakes found throughout the course of review; and (3) identifying documents more likely than the general population to contain privileged materials. This validation protocol may be presented to the customer for approval and may be included in a defensibility binder, as described herein. Further, such documents may be sent back into review and re-reviewed as needed, providing a higher level of defensibility to the overall system and process, and ensuring that documents are not just quality controlled, but are truly ready for production.

With respect to the Production phase, documents that have been subjected to the prior phases are then identified by the customer for production. To the extent that any documents are not produced as a result of being subject to the protections of the attorney-client privilege and/or attorney work product doctrine, those documents may be referenced in a privilege log that is then produced.

Prioritized Review

In another aspect of the present invention, by utilizing state of the art technology tools, the system can rapidly locate documents that are responsive to a matter and organize the review room by this priority. By predictively identifying documents that are responsive, less time and money is spent reviewing non-responsive, or otherwise potentially irrelevant documents. In effect, the system prioritizes the documents in a manner that allows the reviewers to see a higher percentage of responsive and illustrative documents earlier in the review process. In one embodiment, the identification and prioritization of documents may occur before the review process begins, such that the reviewers can review the most responsive documents first. This allows the managers and/or customer to make decisions on review and legal strategy earlier in the review process, and better meet project deadlines.

Figure 4:
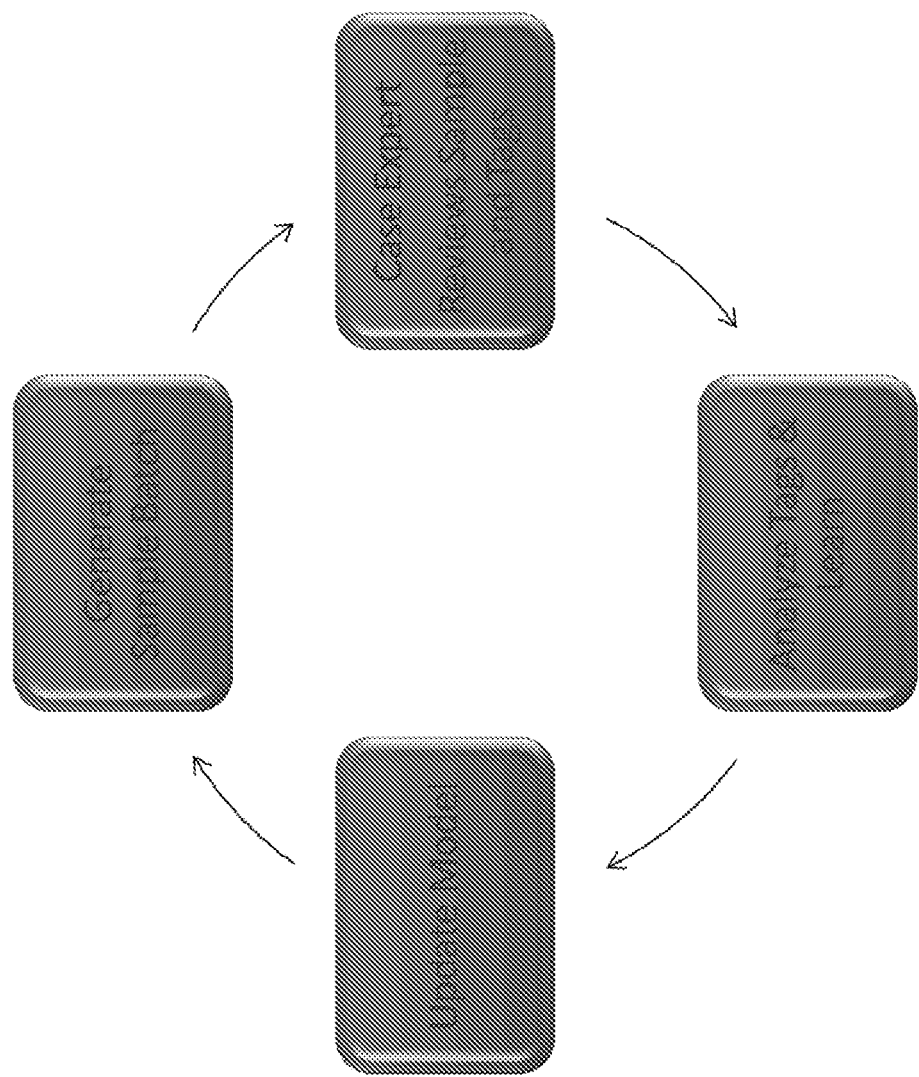
FIG. 4 is a diagram of an exemplary prioritization cycle, according to an aspect of the present invention.
Figure 5:
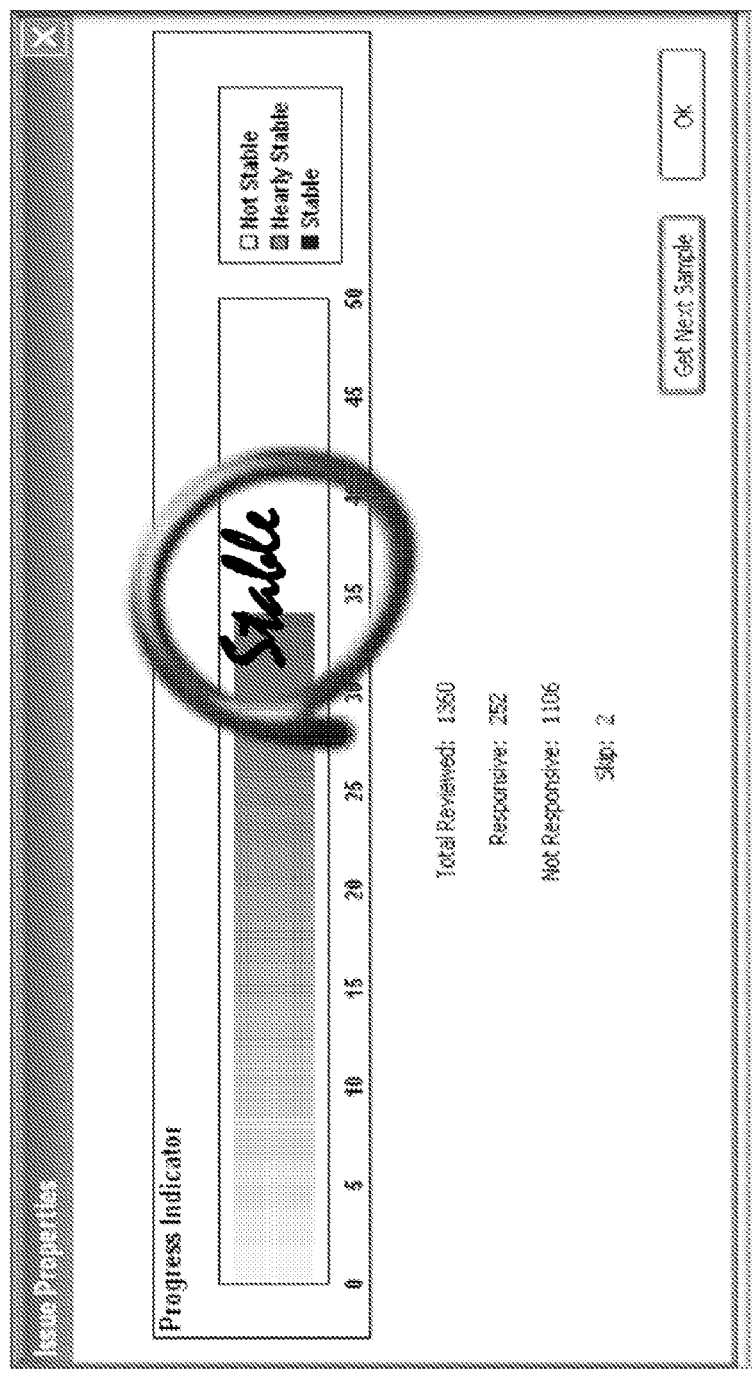
FIG. 5 is a screenshot of the prioritization mechanism reaching stabilization, according to an aspect of the present invention.

In one embodiment, the system allows the user to rank the responsiveness of all or any number of documents in a data set, and prioritize those documents most likely to be relevant to the beginning or earlier in the review queue. As illustrated in FIG. 4, an expert assigned to the case may rate or tag one or more random samples of documents as "Responsive" or "Non-responsive." The tagged set(s) are then used by the system to learn the thought process and patterns of the expert when determining what content in a document makes that document responsive. The system then may present at least one additional document set to the expert, which the expert tags as done previously. This process is repeated until the system recognizes what documents are responsive and which are not. In one embodiment, the system may effectively learn what documents are responsive after completion of between 20-50 expert review cycles. In other embodiments, the system learns after completion of at least 10 expert review cycles, or even after 5 review cycles. As illustrated in FIG. 5, once the system has learned how to identify responsive content, the system is "stabilized" and proceeds to review the entire document pool and can rate the responsiveness of all or any number of the documents in the pool. The system may then place those documents in the review queue with those documents having the highest responsiveness ranking first, such that the review queue is stacked according to responsiveness ranking.

Regarding the above described prioritization mechanisms, the system may include an engine or network having resident therein a plurality of rules, wherein, upon access to information to which such rules may be applied, the rules may be updated, modified, or varied as to which next set of those rules is applied. An engine or network may include, in brief, computer models, algorithms, comparisons, calculations and the like designed to simulate the behavior of human reasoning and learning, but additionally capable of such simulation with data quantities, breadth of calculations and the like that are beyond human capabilities, such as in pattern recognition, data accumulation, language processing, and comparative problem solving. The goal of such programming and execution is a learning by the system such that self-directed information processing may occur. Such an engine may be, for example, a business rules engine that is associated with one or more processors, which may be resident locally and/or at one or more servers. General requirements for construction of generic architectures for such engines and/or networks as understood by those skilled in the art may be used in conjunction with the present invention to perform the novel functionalities as describe hereinthroughout.

Quality Control Mechanisms

The system of the present invention may include one or more quality control mechanisms. In one exemplary embodiment, a standard workflow may include a first level review by a team of attorney reviewers, such as at least 5 attorney reviewers, on a daily basis. The quality control reviewer assigned to the team may receive a randomized document batch comprised of between 0.1-50% of the prior day's review documents. In other embodiments, the randomized document batch may be approximately 11%, 15%, 25% or 30% of the prior day's review. It should be appreciated that the exact percentages of quality control review may be set on a case by case basis, and may further be set differently according to the stage or progression of the project, or based on selected system metrics. In some embodiments, if more than 3 errors are found in any given reviewer's batch, the entire batch is re-reviewed, generally elevating total quality control percentage above selected baselines. The system may set the error number threshold as desired, and in accordance with the level of quality control requested. In other embodiments, the quality control reviewer may perform subjective quality control searches based on information learned in the quality control process.

According to another aspect of the present invention, a second quality control review may be performed that includes a randomized sample batch of between 0.1-10%, and preferably between 2-3% of the prior day's review for review by the customer. This review batch may contain documents that have gone through any of the previously described system quality control reviews and/or those that have not. Depending on customer preferences, first level review by the review team may be at least temporarily suspended until one or more of the quality control reviews are complete. This assists in the prevention of miscommunication or protocol ambiguity from skewing the review or heading it too far off course. Further, by involving the customer in quality control review, the customer may be actively engaged, especially at the beginning of the review, where issues and the protocol are often susceptible to change.

To further implement quality control mechanisms, all available features of the review platform are used to efficiently organize workflows and ensure quality. For example, regardless of platform, all materials may be de-duplicated within and across all custodians, allowing only one copy of a document to reach the review room. Workflow may be further refined by assigning batches comprised of all near duplicates and e-mail threads, making coding decisions consistent and a more comprehensive understanding of the subject matter possible. Reviewers may batch code like documents, increasing speed and consistency in review. Key word highlighting and clustering may also be used to facilitate the review. For example, a presumptively privilege search ontology may be developed that highlights or identifies all documents containing certain characteristics, such as firm domain names and names of counsel, for example, and isolates those documents into one workflow so that they are directed to a specific sub-group of reviewers who may or may not be specially trained in that area. Similarly, workflow may be designed by substantive concept so that specifically trained reviewers may see and review consistent subject matter. In certain embodiments, review order may be prioritized by relevancy ranking to front load the review queue with the most likely responsive documents first, as described herein. Of course, it should be appreciated that any workflow design may be used, and specific workflow structure may be determined based on the platform selected or by general customer preference.

Validation Mechanism

In still other embodiments, the system of the present invention may include a pre-production quality control validation. For example, a three-step approach to validation may be used to identify miscoded documents by creating queries that may 1) find documents miscoded for technical reasons, such as a missing decision on a document; 2) find documents more likely to be coded incorrectly by searching for common mistakes found throughout the course of review; and 3) identify documents more likely than the general population to contain privileged materials. This validation protocol may be presented to the customer for approval and may be included in a defensibility binder, as described herein. Further, such documents may be sent back into review and re-reviewed as needed, providing a higher level of defensibility to the overall system and process, and ensuring that documents are not just quality controlled, but are truly ready for production.

Reporting Mechanisms and Review Metrics

In preferred embodiments, the project management team may hold a morning meeting whereby they receive questions from one or more reviewers in the review room and relay information between the reviewers and the customer. In other embodiments, customers may have direct access to the reviewers via the thin client graphical user interface. The morning meeting may serve as an ongoing training vehicle whereby as issues surface or new facts present themselves, the review team can be apprised daily of the customer's direction, thinking and strategy. In other embodiments, this feedback is continuously transmitted to the reviewers in the review room, allowing for the alteration or adjustment of workflow according to this feedback to occur in real-time.

A report may be prepared at any time, such as a daily report, for the customer. An exemplary report is illustrated in FIG. 6. The report may contain any issues and/or open items, such as procedural or technical issues, questions from the review room, and/or documents of interest. While not required, it is preferred that the customer provides comments in writing in response to the report. Any response provided by the customer may form part of a project "defensibility" binder (described herein) to memorialize all decisions made. The documents of interest are highlighted as those documents the customer should review as a priority because they support/refute a legal strategy or otherwise contain information of which the client should be aware.

Figure 7:
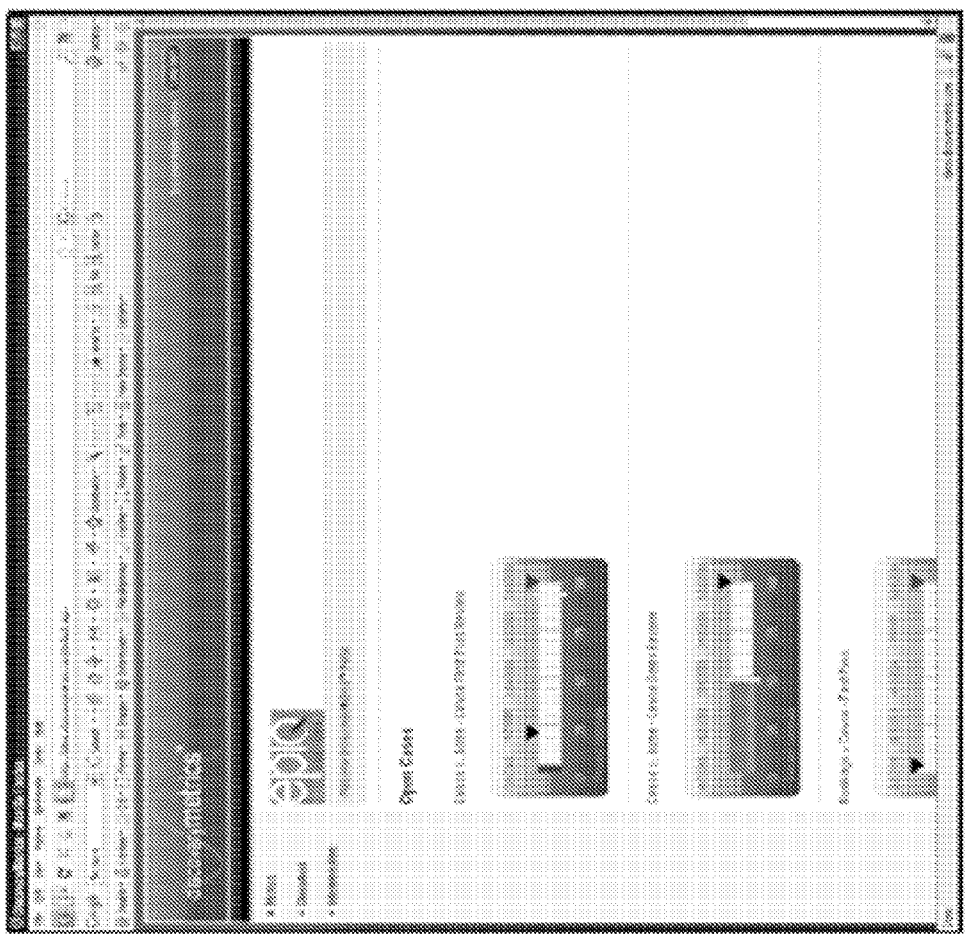
FIG. 7 is a screenshot of an exemplary dashboard accessible via a web portal, where the dashboard presents review room metrics, according to an aspect of the present invention.
Figure 8:
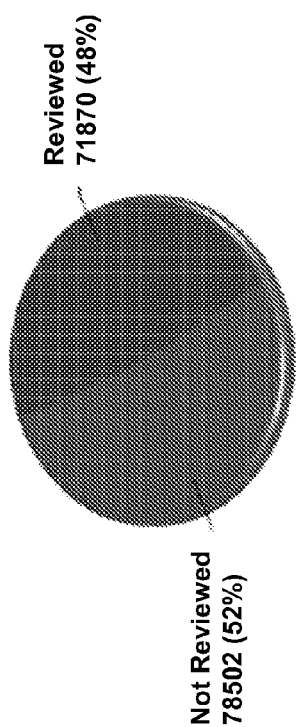
FIG. 8 is a chart of metrics pertaining to review status, according to an aspect of the present invention.
Figure 9:
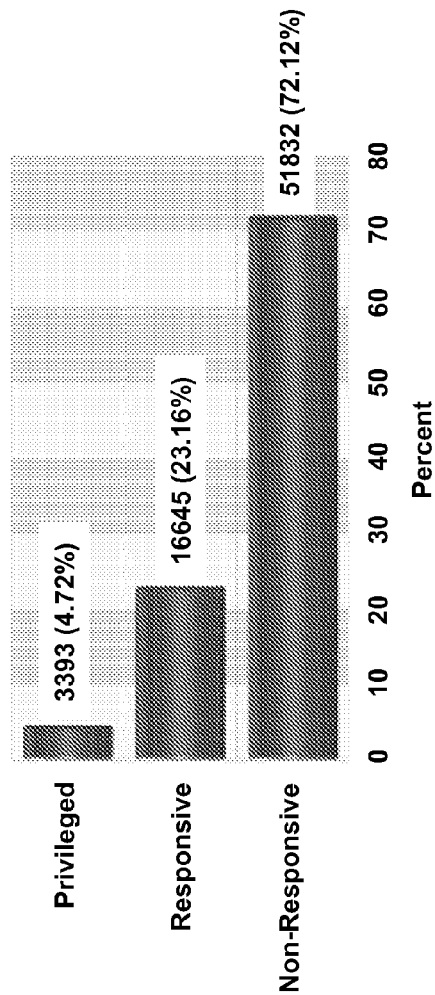
FIG. 9 is a chart of metrics pertaining to designation analysis, according to an aspect of the present invention.
Figure 10:
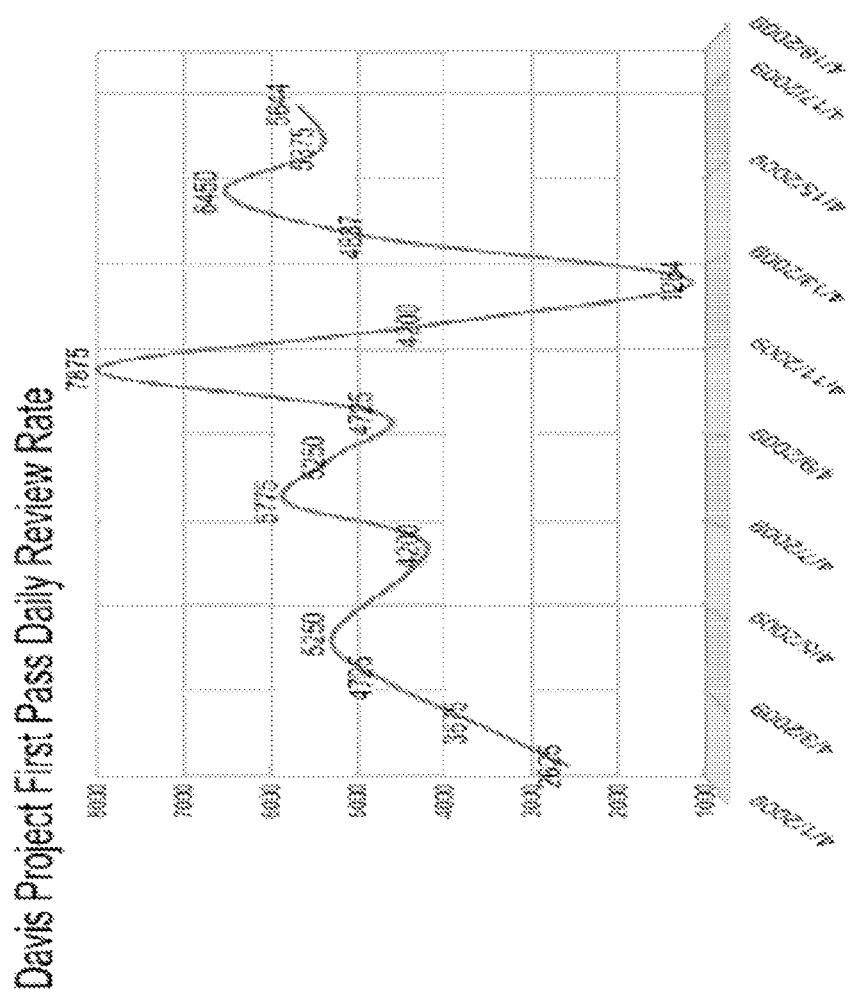
FIG. 10 is a chart of metrics pertaining to project review rate, according to an aspect of the present invention.
Figure 11:
FIG. 11 is a chart of metrics pertaining to reviewer productivity and/or quality comparisons, according to an aspect of the present invention.
Figure 12:
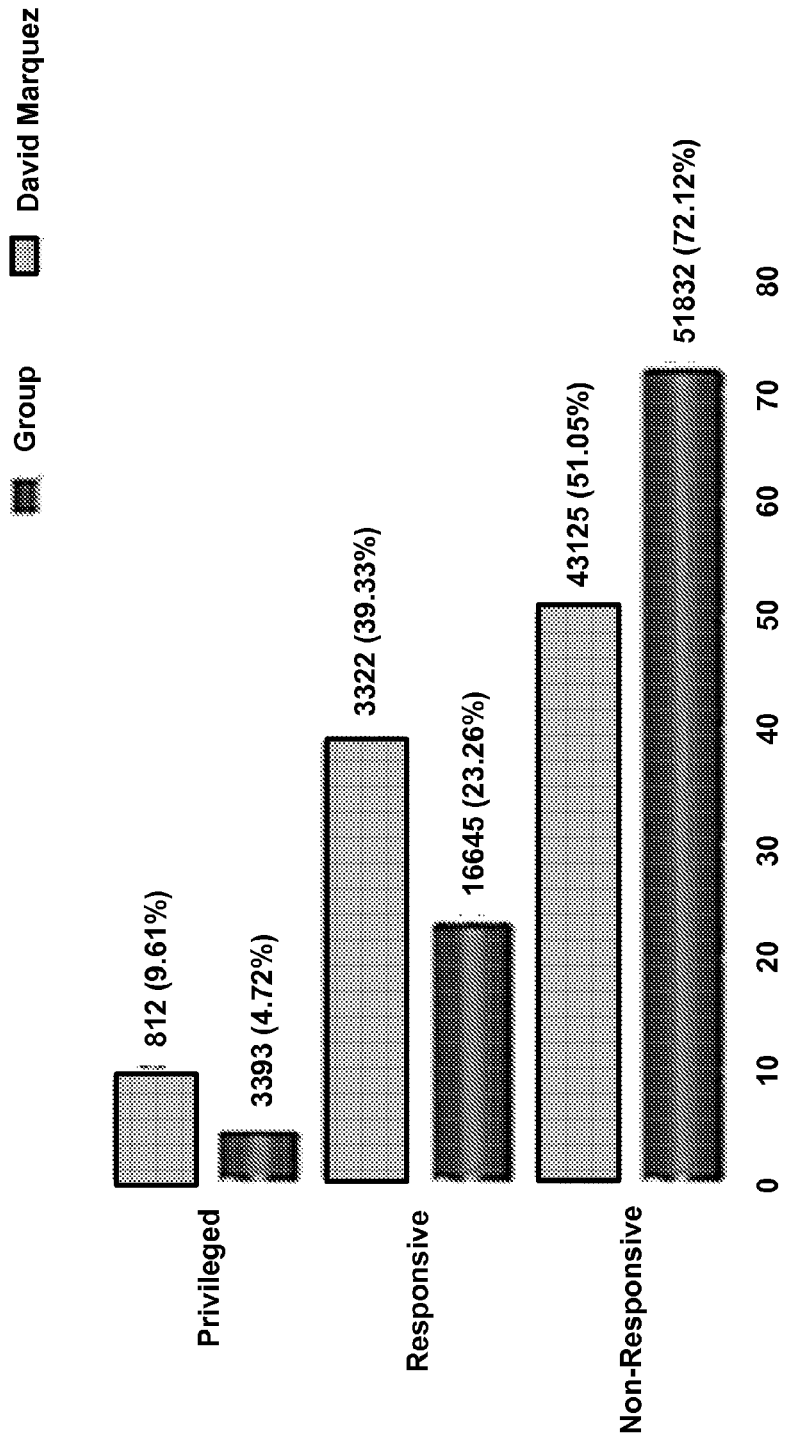
FIG. 12 is a chart of metrics pertaining to designation benchmarking, according to an aspect of the present invention.
Figure 13:
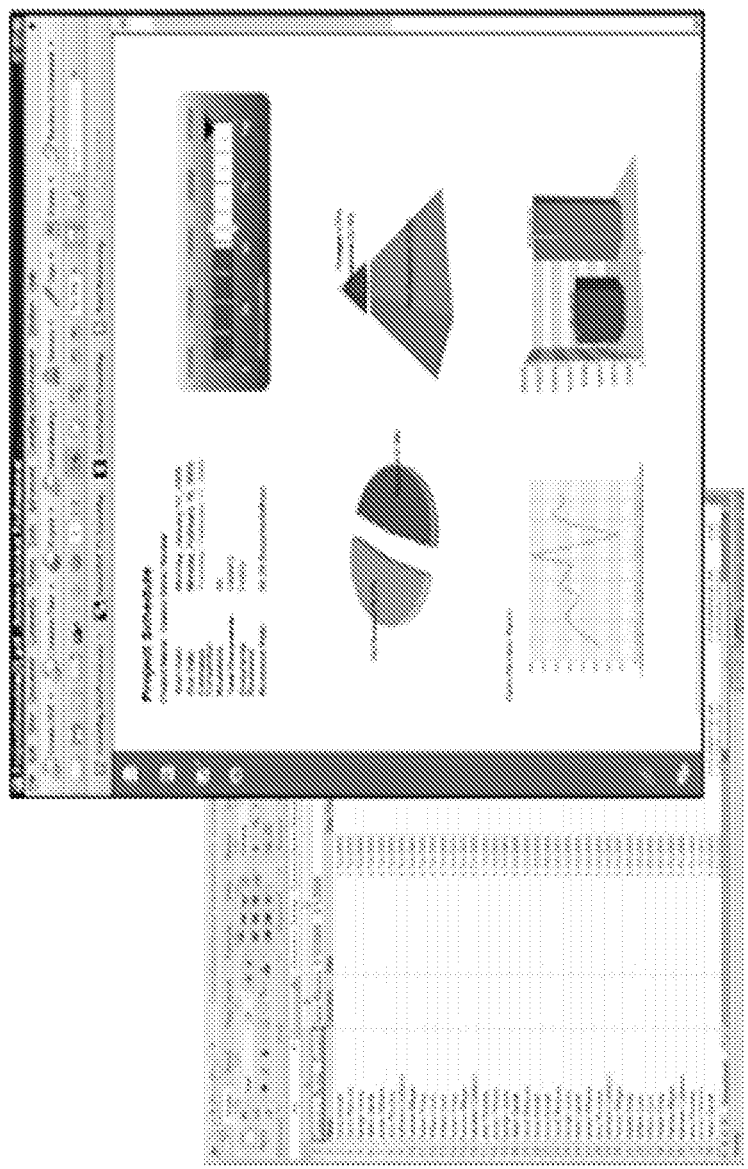
FIG. 13 is a chart of metrics pertaining to reporting, according to an aspect of the present invention.

In addition, the system of the present invention may also track review room metrics continuously or periodically and present the data as an online dashboard accessible by either one or both of the project management and the customer via a web portal (FIG. 7). Exemplary metric charts and reports from such a dashboard are illustrated in FIGS. 7-13. Optionally, these metrics may form part of any report as described hereinthroughout. For example, such metrics may include, without limitation, review data pertaining to review status (FIG. 8), designation analysis (FIG. 9), project review rate (FIG. 10), reviewer productivity and/or quality comparisons (FIG. 11), designation benchmarking (FIG. 12), and reporting (FIG. 13). In other embodiments, the metrics may include or relate to data or a depiction of general quality control to assess individual reviewer performance against the review group, both quantitatively and qualitatively.

As contemplated herein, the metrics provide a project manager, system manager or the customer the ability to see, either periodically or continuously, anything from individual reviewer productivity, to calls, tagging or other decision making by individual reviewer, and assess error rates for significance and project timelines for completion. For example, by reviewing the metrics on the performance of Reviewer 1, it can be determined if Reviewer 1's responsiveness rates are significantly off the review team average. By drilling down on each of these metrics continuously or a periodic basis, managers and/or the customer can decide how to manage one or more reviewers or even the entire review team. Specific accuracy metrics are also available by reviewer so that to the extent the customer prefers a bright line measure that can be supported as well.

Privilege Review and Privilege Logs

The system of the present invention may also assist with privilege review, and in the drafting of a privilege log. This can be done either on a rolling basis or at the conclusion of any production set produced to an opposing counsel, for example. The overall privilege review component of the present invention can be summarized as follows. A first objective is to determine which documents should appear on a privilege log and to articulate the reasons why. A second objective is to determine which documents were coded as privileged incorrectly and hold them for potential production. The third objective is to identify documents for which the judgment of the customer is needed on matters of policy or case strategy.

Within each of these categories, the system is made accessible to the customer to review and correct decisions of the privilege reviewers.

In some respects, the privilege review is procedurally similar to first-level review; the privilege team member checks out a batch of documents that will include complete attachment sets, identifies which of the above "buckets" the document belongs in and if privileged, refines the basis language and makes it consistent across entries. These changes are made in the review platform wherever possible (some platforms do not allow for text addition) so that the "log" can be regenerated as necessary from the data housed in the platform.

A crucial distinction, however, is that the privilege reviewer must track down opportunities for inconsistency and correct them whether or not those documents are contained within the assigned batch. For example, if an email is in a thread and the platform allows for threading views, it is expected that the reviewer will read and reconcile coding and privilege treatment for every document in that thread. Similarly, if the platform allows, it is expected that the privilege reviewer will view all near duplicates and determine whether consistent treatment is required.

As the documents come to the reviewer, he or she may confirm or remove a previous privilege coding, note the locations for any necessary redactions, and/or identify any issues for customer review. The reviewer may record a basis description for documents to be logged as an inseparable part of the process. In certain embodiments, an assessment of whether a document is privileged in whole or part may require some articulation of the reason why. In these instances, the team may take one complete pass at each document, as opposed to a multi-tiered approach.

For example, the system may begin at review inception by customizing a first level review template to capture as much information as possible about privilege bases. For example, where the review platform allows conditional coding, when a reviewer selects a document as privileged or partially privileged, the reviewer will then be forced to select one or more categories, such as "Attorney-Client" or "Work Product," as a primary basis for the privilege. In some instances, a set of secondary or sub-bases will be available, depending on the primary basis selected. For example, if "Attorney-Client" is selected, the reviewer may then select one or more secondary bases from the provided list of secondary bases, such as "non-attorney" or "attorney requesting legal advice." Such selections may optionally include a brief textual reference. After tagging the information, the information is compiled and exported from the system platform as the starting point for a privilege review.

Any documents marked partially privileged or privileged may be re-batched and sent to a privilege log team or designee for verification and log "clean-up," based on the initial descriptions entered by reviewers. At this stage, the privilege team is focused on isolating potential questionable privilege calls and making descriptions consistent between document families and similar subject matter. After verification and clean-up, a privilege log is generated, as illustrated in FIG. 14. Upon final sign off and decisions on the yellow highlighted entries, the privilege team may finalize the log and deliver it in any format requested by the customer.

At the end of the privilege review process, any number of electronic folders of documents may be created, along with a corresponding spreadsheet, such as an Excel spreadsheet. For example, if three electronic folders are created, the first folder and tab may match the draft log generated as part of the process, including harmonized complete basis descriptions with the degree of specificity determined by the customer. The second folder may contain the documents the privilege reviewers consider to be candidates for production because the initial privilege call by the review team appears overly conservative. The third folder may contain the documents that contain true privilege queries that should receive the specific attention of counsel as the impact of the privilege call may impact strategy, other current cases, and the like.

Following the customer's review and direction on each of the three sets, the log and any redactions may be finalized and a further document production, to the extent necessary, may be scheduled.

This privilege process preferably requires customer oversight and guidance, but does not result in a full scale re-review or log generation tasks by the customer. Specifics as to nature of descriptions required, format, identification of legal actors, etc. may all be determined up front with a privilege questionnaire, so that the customer's role is targeted, defined and substantive.

Preferably, members of the privilege team are those attorneys with significant substantive experience and specifically privilege log defense experience. These attorneys may or may not assist in first level review for subject matter continuity but are part of the system pool of reviewers for their privilege expertise. If the privilege team is not participating in the first level review on the project, then at least a selected number of the privilege team members will be updated regularly on the status of the project and may have access to some or all customer communications during the review.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed:

1. A computer implemented system for reviewing electronic documents provided by a customer, comprising:
    a document review software or hosted platform resident on a remote server;
    reviewer performance tracking software resident on the remote server;
    a plurality of thin client review stations; and
    at least one networked device that permits the document review software or hosted platform and the reviewer performance tracking software resident on the remote server to be accessible by the plurality of thin client review stations;
    wherein electronic documents provided by the customer are reviewed by a review team via the thin client review stations.

2. The system of claim 1, further comprising prioritizing the electronic documents prior to review by the review team.

3. The system of claim 1, wherein a report is generated that includes at least one metric pertaining to the performance of the review team.

4. The system of claim 1, wherein the customer is communicatively connected to the system via a communications network.

5. The system of claim 1, wherein the review team includes at least one attorney.

6. The system of claim 1, wherein the review team includes at least one project director.

7. The system of claim 1, wherein the review team includes at least one quality control reviewer.

8. The system of claim 1, wherein a physical review room contains the plurality of thin client review stations for the review team to review documents.

9. The system of claim 1, wherein a quality control review team reviews up to 50% of the documents reviewed by the review team.

10. The system of claim 9, further comprising a quality control error number threshold.

11. The system of claim 10, wherein when the quality control review team reaches the error number threshold, the review team re-reviews the documents.

12. The system of claim 9, wherein the quality control review includes multiple review rounds.

13. The system of claim 9, further comprising a pre-production quality control validation.

14. The system of claim 1, wherein the documents to be reviewed by the quality control review team are selected randomly.

15. A system for reviewing electronic documents provided by a customer, comprising:
- a document review software or hosted platform resident on a remote server;
- reviewer performance tracking software resident on the remote server;
- a plurality of thin client review stations; and
    - at least one networked device that permits the document review software or hosted platform and the reviewer performance tracking software resident on the remote server to be accessible by the plurality of thin client review stations; a review team including at least one attorney;
- a physical review room accessible only by the review team;
- wherein the review team is trained via review of a training documents set;
- wherein electronic documents provided by the customer are reviewed by the review team via the thin client review stations while in the physical review room;
- wherein a quality control review team reviews up to 50% of the documents reviewed by the review team;
- wherein the performance of the review team is measured according to at least one metric via the reviewer performance tracking software; and
- wherein a report is generated that includes information pertaining to the at least one review team performance metric.

\* \* \* \* \*